Oct. 27, 1953     C. C. JOHNSON     2,656,925
EMULSION TREATER

Filed June 15, 1950     2 Sheets-Sheet 1

CECIL C. JOHNSON
INVENTOR

BY Herbert J. Brown
ATTORNEY

Oct. 27, 1953

C. C. JOHNSON
EMULSION TREATER 2,656,925

Filed June 15, 1950

CECIL C. JOHNSON
INVENTOR

BY Herbert J. Brown
ATTORNEY

Patented Oct. 27, 1953

2,656,925

UNITED STATES PATENT OFFICE 2,656,925

EMULSION TREATER

Cecil C. Johnson, Kermit, Tex.

Application June 15, 1950, Serial No. 168,252

3 Claims. (Cl. 210—52.5)

This invention relates to improvements in emulsion treaters for separating water from oil-water emulsions produced from oil wells. Particularly, the invention has reference to emulsion treaters wherein the emulsion is heated to effect the separation of the water from the oil.

A feature of the invention is the provision of a horizontal fire tube along the interface between the separated oil and water in the treater tank, and whereby additional separation may be readily effected by introducing additional emulsion and at the same time draining or bleeding the separated water. By employing a long horizontal treating tank, and positioning the fire tube or tubes horizontally through the approximate center of the tank, a relative large interface may be treated, and at the same time a constant temperature of a required degree may be maintained substantially throughout the length of the tank. The fire tube and tank arrangement referred to is capable of treating large volumes of emulsion in relatively short periods of time.

Another feature of the invention resides in a construction wherein the fluids within the tank remain in a nearly static condition during operation, and whereby the interface between the water and oil is not appreciably disturbed. Since the separation takes place primarily along the interface, such static condition increases the efficiency of the treater.

Another feature of the invention is a slip joint assembly between one end of the fire tube and the corresponding end of the tank and whereby the elongation and longitudinal contraction of the tube is accommodated. The construction of the slip joint is such that the packing is not subjected to the high temperature of the fire tube, but is mounted in a manner so that the temperature of the packing is substantially equal to that of the fluids within the tank. Additionally, the arrangement provides for the removal of the tube for removing scale or for making repairs.

A further feature or object of the invention is the provision of a gas accumulation chamber constructed to prevent venting the gas which is inherently present in the crude petroleum emulsion before processing. In the present invention, the gas which accumulates in the top of the chamber may be conveyed to storage along with the separated oil discharged from the processing tank, from where it is subsequently removed.

A further object is to provide an oil-water emulsion treater having relatively few controls, and whereby the operation is made relatively simple.

These and other objects of the invention will be more readily understood by reference to the accompanying drawings and the following description of an exemplary form of the invention.

Figure 1:
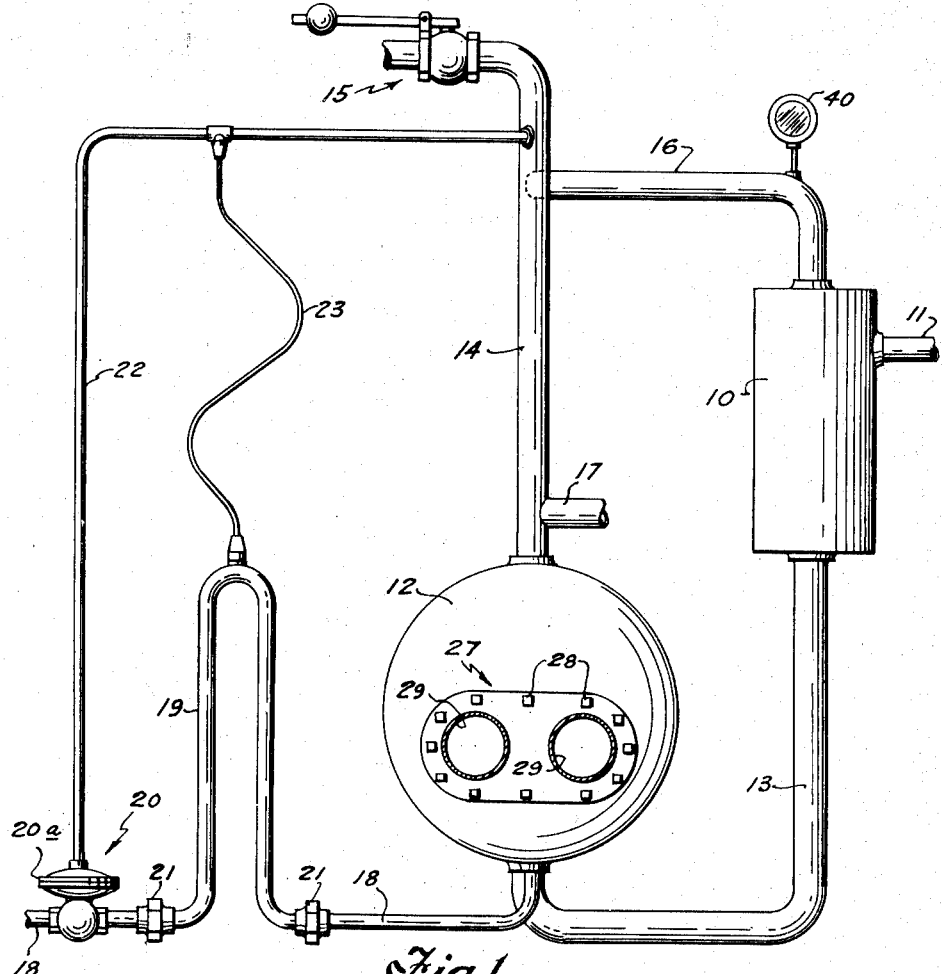
Figure 1 is an end elevation of an oil-water emulsion treater embodying the features of the invention.
Figure 2:
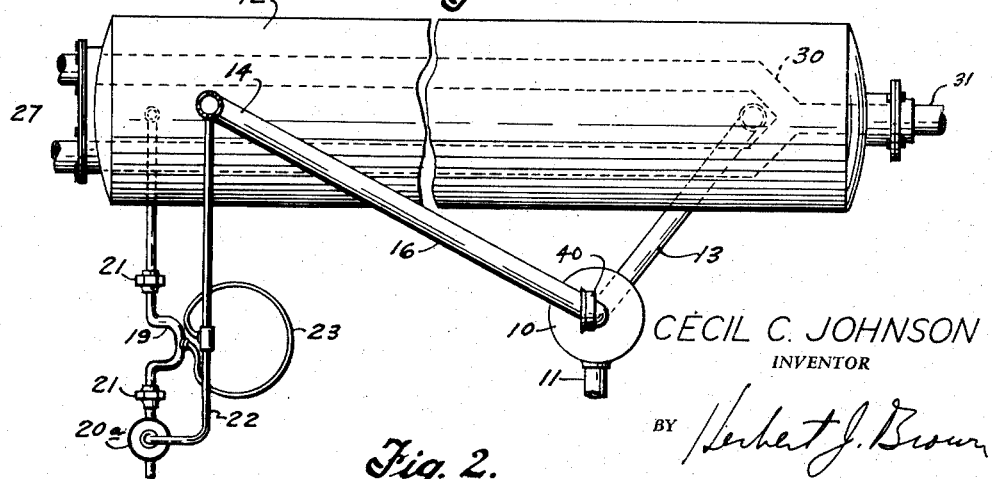
Figure 2 is a plan view of the treater illustrated in Figure 1.
Figure 3:
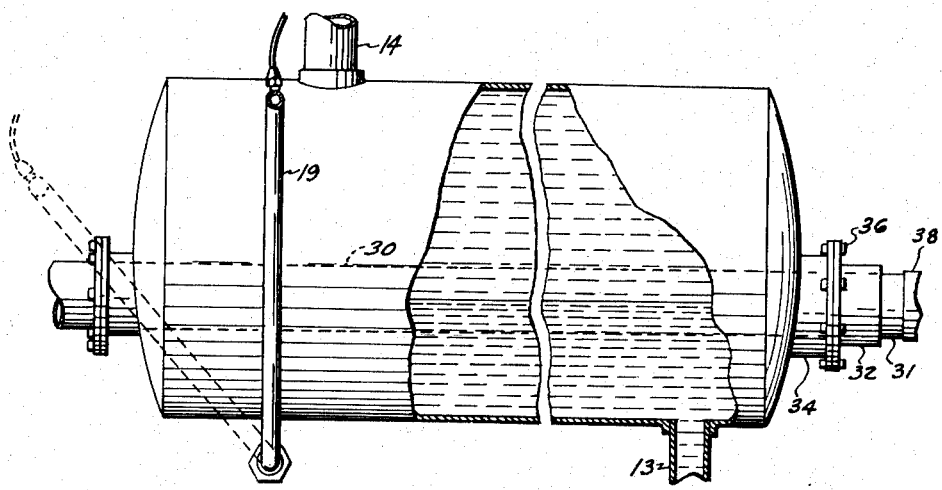
Figure 3 is a broken side elevation and sectional view of the processing tank and its adjoining parts.

In the drawings, the numeral 10 indicates a vertical cylindrical chamber or gas accumulator having an inlet 11 connected between its upper and lower ends for receiving the oil-water emulsion. A cylindrical horizontal processing tank 12 is positioned lower than the chamber 10 and has one of its lower ends connected with the lower end of the chamber 10 by means of a conduit 13. A vertical conduit 14 extends from the upper end of the tank 12 opposite the conduit 13 and has a safety relief valve 15 connected with its upper end. Still another conduit 16 connects the upper end of the chamber 10 with the vertical conduit 14 near its upper end, and an oil discharge line 17 is connected with the latter (14) near its lower end.

Figure 4:
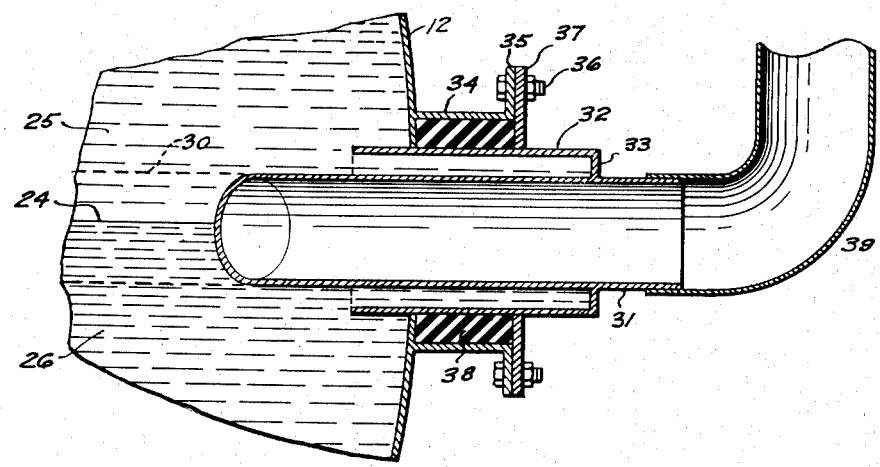
Figure 4 is an enlarged broken sectional view of one end of the processing tank and showing the slip joint assembly in section.

A water bleeder line 18 is connected with the bottom and end of the tank 12 opposite the conduit 13 and includes a pivoted siphon 19 and a diaphragm operated valve 20 connected therein and outwardly from said tank. Flanged unions 21 connect the lower ends of the siphon 19 with the bleeder line 18 and whereby the referred to pivotal action may be carried out for changing the siphon's relative height. A gas pressure line 22 is connected between the valve 20 and the upper end of the vertical conduit 14, and a flexible and relatively long equalizer line 23 is connected between the upper end of the siphon 19 and the upper end of the pressure line 22. The arrangement of the siphon 19, valve 20, pressure line 22, and equalizer line 23 are conventional and in the present invention are for regulating the elevation of the interface 24 between the oil 25 and water 26, as shown in Figure 4. It is to be understood that any suitable fluid level control may be employed for the last described purpose.

A furnace 27 is secured by bolts 28 in one end of the tank 12, and in the form of the invention shown includes a pair of fire tubes 29 in horizontal parallel relation and joined by means of a Y connection 30 to an extending tube 31. The Y connection 30 and the fire tubes 29 may be eliminated and a single tube, such as 31 extended, may be substituted therefor and yet be within the scope of the present invention. The fire tube extension 31 is positioned through the end of the tank 12 opposite the furnace 27 where it is provided with a cylindrical jacket 32 having a closed outer end 33 for connection with said extension. Although not shown in the drawings, the last described parts 31, 32 and 33 may be welded together in the positions described. A cylindrical packing housing 34 is welded or otherwise secured to the end of the tank 12 and around and spaced from the jacket 32. The outer end of the housing 34 is flanged, as at 35, to accommodate bolts 36 for retaining a packing holding ring 37. Packing material 38 is contained within the housing 34 and is in sliding contact with the outer surface of the jacket 32. If desired, the outer end of the extension 31 may be provided with a flue 39 for drawing the flame from the furnace through the tubes 29, and for directing the heat upwardly above the apparatus. A pressure gage 40 may be connected with the conduit 16, if desired.

In operation, the oil-water emulsion is introduced to the chamber 10 through the inlet 11, and is fed by gravity into the tank 12. Heat supplied by the fire tubes 29 and the extension 31 initially separates the water 26 and the oil 25 to form the interface 24.

Since the temperature of the fire tubes 29 is greater than the temperature of the tank, the former expands longitudinally to the greater degree than the latter. However, the described action between the jacket 32 and the packing 38 permits expansion and contraction of the fire tubes without loss of fluid from the tank 12.

Continued application of heat along the interface 24 further separates the oil 25 and water 26. By reason of the pressure in the inlet 11, additional emulsion is introduced into the tank by way of the conduit 13. Since the untreated emulsion is lighter than water and heavier than oil, it will seek a level along the interface 24. The increase in volume of water 26 raises the interface 24, and by reason of its increased height, a portion of the water is forced over the siphon 19. The weight of the water 26 in the outer leg of the siphon 19 opens the valve 20 and is discharged. At the same time a portion of the increased volume of oil is conveyed to storage through the discharge 17. By reason of the equalized pressures on opposite sides of the diaphragm 20a of the valve 20, only the weight of the water in the outer leg of the siphon 19 will open said valve. Thus, pressure variations in the tank 12 will not force the interface 24 to fall below the level determined by the height of the siphon 19. The described operation does not materially disturb the fluids in the tank 12.

The present invention is not limited to the specific construction herein shown and described, but may be made in many ways within the scope of the appended claims.

What is claimed is:

1. In an emulsion treater for separating oil and water from oil-water emulsions, a processing tank, a horizontal fire tube extending through said tank and having one end secured to one end of said tank, a cylindrical jacket surrounding the remaining end of said fire tube and communicating with said tank and having a closed outer end connected to said fire tube, said jacket being mounted for movement through the remaining end of said tank when said fire tube longitudinally expands and contracts, a packing secured to the last referred to end of said tank and positioned around said jacket, means introducing the emulsion to be treated into the bottom of said tank and separate means discharging the separated oil and separated water from the upper and lower portions of said tank, respectively.

2. In an emulsion treater as defined in claim 1, the construction wherein said fire tube is comprised of a pair of horizontal parallel tubes having corresponding ends thereof secured to one end of said tank, a Y connection joining the remaining ends of said tubes within said tank, and an extension tube connected with said Y connection and extending through said packing.

3. In an emulsion treater as defined in claim 1, the construction wherein said fire tube is comprised of a pair of horizontal parallel tubes having corresponding ends thereof secured to one end of said tank, a Y connection joining the remaining ends of said tubes within said tank, and an extension tube connected with said Y connection and extending through said jacket.

CECIL C. JOHNSON.

References Cited in the file of this patent

UNITED STATES PATENTS

| Number | Name | Date |
|---|---|---|
| 1,326,618 | Strother | Dec. 30, 1919 |
| 1,500,286 | Terriault | July 8, 1924 |
| 2,103,981 | Hall | Dec. 28, 1937 |
| 2,111,748 | Brand | Mar. 22, 1938 |
| 2,152,863 | Bills | Apr. 4, 1939 |
| 2,167,160 | Raymond | July 25, 1939 |
| 2,179,131 | Millard | Nov. 7, 1939 |
| 2,181,687 | Walker | Nov. 28, 1939 |
| 2,232,948 | Ihrig et al. | Feb. 25, 1941 |
| 2,261,057 | Erwin | Oct. 8, 1941 |
| 2,308,757 | Hulsberg | Jan. 19, 1943 |
| 2,319,962 | Walker | May 25, 1943 |
| 2,488,807 | Currie | Nov. 22, 1949 |
| 2,520,304 | Brand | Aug. 29, 1950 |